Sept. 8, 1964   J. C. MAXSON   3,147,488
SUN GLASSES CONSTRUCTION
Filed Sept. 24, 1962

INVENTOR
JOHN C. MAXSON
BY Robert M. Dunning
ATTORNEY

United States Patent Office 3,147,488
Patented Sept. 8, 1964

3,147,488
SUN GLASSES CONSTRUCTION
John C. Maxson, 1885 Bayard Ave., St. Paul, Minn.
Filed Sept. 24, 1962, Ser. No. 225,624
6 Claims. (Cl. 2—13)

This invention relates to sun glasses construction and in particular to the construction of sun glasses auxiliary to the glasses worn by the individual.

For many years auxiliary sun glasses to be attached to spectacles have been relatively common. It has become necessary to improve the quality of the auxiliary glasses while endeavoring to maintain and improve manufacturing cost indexes. While noticeable improvement has been made in the manufacture of the lenses and the ability to maintain relatively low costs per unit, the frame portion of the auxiliary sun glass has not kept apace of the improvements in manufacturing processes.

It is an object of the present invention to provide a frame for attachment of sun glass lenses adapted to reside on a pair of spectacles, wherein the frame is relatively simple to manufacture, and manufacturing costs and equipment may be kept at reasonable levels.

It is a further object of the present invention to provide a frame to which sun glass lenses are secured adapted to reside on a pair of spectacles wherein the frame is deformable to the general outline of the spectacles on which they reside. Generally, the purchaser of auxiliary sun glasses is confronted with the problem that if their ordinary spectacles have a somewhat unusual frame structure as is true in the case of many of the glasses purchased by women today, the auxiliary sun glasses project above or below the ordinary spectacle frame and are somewhat unsightly and may even interfere with the vision of the wearer. The present invention has obviated the necessity of the purchasers of spectacles buying a separate pair of sun glasses in order to avoid this somewhat unsightly appearance and vision impairment by providing a frame deformable at the bridge to conform to the general outline of the spectacles worn under the auxiliary sun glasses.

It is a further object of the present invention to provide an auxiliary sun glasses construction adapted to reside on ordinary spectacles having a particularly simple means of supporting a clip designed to hold the auxiliary sun glasses in engagement with the ordinary spectacles over which they are worn. In the past, usual methods of contruction have generally employed a spring clip which has been secured pivotally to a shaft which in turn was secured to the bridge or frame in some manner. In many instances the shaft has been supported in notches or apertures in the body of the frame by compression of the frame. Where the frame becomes deformed the shaft loosens and eventually is dislodged resulting in loss of the shaft, the clip, or both. Even where the shaft has only loosened, the clip tends to work with decreased efficiency and the wearer is eventually forced to forego the use of the auxiliary sun glasses or to purchase a replacement pair. In some instances the shaft on which the clip has been pivotally secured has been retained in place in the frame by attaching means such as screws or in some instances by embedding the shaft in the frame. It is an object of the present invention to provide a means of securing the shaft to an offset bridge of the auxiliary sun glasses in such a manner that the lenses will provide means of retaining the shaft within the bridge.

It is a further object of the present invention to provide an auxiliary sun glasses construction wherein the auxiliary sun glasses have a generally horizontal frame member having an offset medial bridge, a shaft extending horizontally through the bridge aligned with edges of lenses fastened to the frame. By alignment of the shaft and the inner edges of the lenses, the lenses serve as retention means to laterally retain the shaft within the aperture in the bridge through which the shaft extends, the portions of the shaft within the bridge or projecting therefrom on either side of the bridge adjacent the lens edges providing means for engagement of a clip to hold the auxiliary sun glasses in position on the ordinary spectacles. As is apparent, a particularly simple method of attachment for the spring biased clip is thus made available. The manufacturer thereby is able to establish a less costly manufacturing operation and a much more simplified method of assembly.

A further object of the present invention is to provide a shaft extending horizontally through an aperture in the offset bridge of the frame of a pair of auxiliary sun glasses to which a clip may be secured, the shaft being movable within predetermined limits within the aperture both vertically and laterally. The amount of lateral movement of the shaft being restricted by alignment of the shaft with the inner edges of the lenses and the amount of vertical movement being restricted by the diameter of the aperture. As has been previously mentioned, the auxiliary sun glasses are deformable at the bridge to conform to the general outline of the ordinary spectacles, the predetermined vertical movement of the shaft cooperably enabling the auxiliary glasses to be deformed without impairing the function of the shaft in relation to the clip.

A further object of the present invention is to provide a notch or recess in the upper edge of the medial offset bridge to engage a spring secured to the shaft and bearing against the body of the clip to springably hold the clip in a closed position.

A further object of the present invention is to provide a frame to which the auxiliary sun glass lenses may be secured by riveting the lenses to the frame.

A further object lies in the manner in which the frame, shaft, clip assembly, and lenses are put together. In preferred construction the frame comprises a one-piece member having an offset medial bridge. An aperture extends through the offset bridge portion parallel to the generally horizontal frame. In construction employing a coiled spring, the spring is place horizontally within the offset bridge in alignment with the aperture extending through the sides of the bridge. The clip assembly is then mounted by placing the depending lobes of the assembly through which an aperture extends in alignment with the spring and the apertures in the sides of the bridge, the shaft then being inserted to hold the clip assembly and spring in desired position. One extremity of the spring is engaged within the notch in the upper edge of the offset bridge, and the other extremity is engaged against the clip body. The lenses are then riveted to the frame. The inner edges of the lenses are in alignment with the portions of the shaft extending through the bridge.

These and other features and objects will appear as set forth more fully in the following specifications and claims, and taken in conjunction with the drawings wherein:

Figure 1:
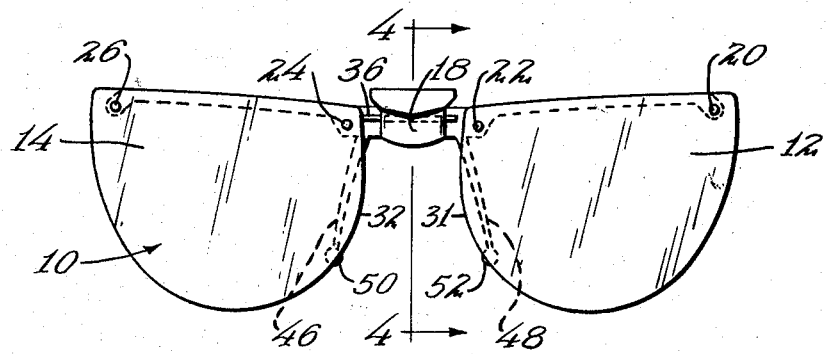
FIGURE 1 is a front plan view of the auxiliary sun glasses construction.
Figure 2:
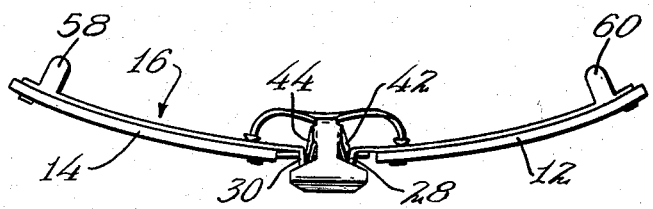
FIGURE 2 is a top plan view of the auxiliary sun glasses construction particularly showing the interrelation of the various parts.

Referring now to the drawings and in particular to FIGURE 1, the drawings show a pair of auxiliary sun glasses generally indicated by the numeral 10 having a pair of lenses 12 and 14 which may be of any desired optical property.

Figure 5:
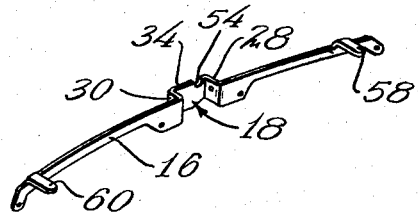
FIGURE 5 is a perspective of the frame without the lenses.

The lens 12 and 14 are rivetally fastened to a frame 16 having an offset medial bridge portion 18, the lenses 12 and 14 being positioned on each side of the medial bridge portion 18. Each lens has apertures registrable with similarly spaced apertures in the frame through which rivets 20, 22, 24, 26 are inserted to engage the lenses 12 and 14 to the frame 16. As is apparent in FIGURE 1, the frame 16 extends along the upper edges of the lenses 12 and 14. The frame 16 is a generally elongated horizontal member preferably of deformable metal and which has an offset medial bridge portion 18 extending intermediate the inner edges of the lenses 12 and 14. In preferred construction, the offset medial bridge 18 has sides 28 and 30 extending outwardly from the frame 16 intermediate the inner edges 31 and 32 of the attached lenses 12 and 14 and a connecting portion 34 connecting the outermost extremities of the sides 28 and 30. Aligned apertures extend through the bridge sides 28 and 30 as is apparent in FIGURE 5, the apertures being aligned with each other and with the inner edges 31 and 32 of the lenses 12 and 14. Through the apertures in each side 28 and 30, a shaft 36 extends having outer extremities 38 and 40 which extend beyond the opposed sides 28 and 30 of the bridge 18 and in alignment with the inner edges 31 and 32 of the lenses 12 and 14. The alignment of the apertures in the bridge sides 28 and 30 and the shaft 36 which extends through the apertures with the inner lens edges 31 and 32 of the lenses 12 and 14 enables the inner lens edges 31 and 32 to prevent lateral displacement of the shaft 36 from within the bridge 18.

The shaft 36 is a generally cylindrical member of substantially uniform diameter, and preferably made of metal which may be deformed by bending without loss of the shaft function which will be discussed later.

Figure 3:
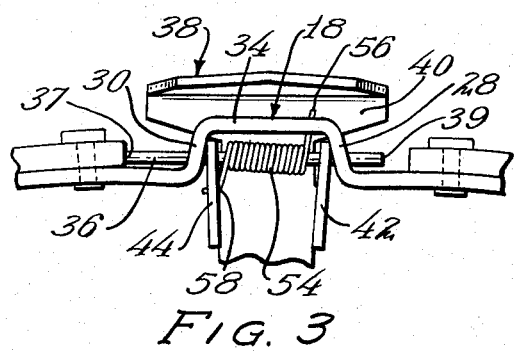
FIGURE 3 is an enlarged fragmentary bottom plan view showing the relation of the parts within and to the offset medial bridge.

As is apparent in FIGURE 3 the shaft 36 is designed to provide a means of support and attachment for a clip assembly 38 which serves to hold the auxiliary sun glasses 10 in position on a pair of ordinary spectacles. The clip assembly 38 is comprised of a clip body 40 of the usual construction which may be of metal or other suitable stiff material having a relatively flat top portion with depending opposed lobes 42 and 44 through which aligned apertures extend. The width of the spacing between the lobes 42 and 44 is determined by engagement of the lobes 32 and 34 on the shaft within the sides 28 and 30 of the bridge. In modified construction, the clip body 40 may be altered to engage on the shaft 36 to conform to the type of spring mechanism being used. For example, a leaf spring or spring shaft is usable in place of the preferred coil spring to provide the spring tension necessary to hold the clip assembly in a closed position in which case modification of the clip body 40 could be made. A pair of depending arms 46 and 48 depend from the clip body 40. The arms 46 and 48 may be arcuately elongated, the extremities 50 and 52 of the arms 46 and 48 engaging against a surface of the lenses 12 and 14 when the auxiliary sun glasses are not in use, or against the lenses of the ordinary spectacles when the auxiliary sun glasses are being worn.

Figure 4:
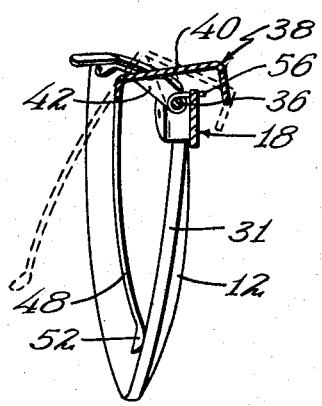
FIGURE 4 is a side elevation of the invention.

In preferred construction a coil spring 54 is used. The upper edge of the connecting portion 34 of the bridge 18 has a recess or notch 54 into which one of the extremities 56 of the spring engages, the other extremity 58 of the spring engaging against the clip body 40. The recess or notch 54 engages the spring extremity 56 to prevent lateral movement of the spring. Further, by having a portion of the extremity 56 extend through the recess 54 past the outer surface of the connecting portion 34, the spring 54 is not liable to become disengaged from its position by coiling itself upon shaft 36, the spring thereby preserving its tension and its ability to urge the clip assembly into a closed position. The pivotal movement of the clip assembly 38 about the shaft 36 is apparent in the drawing of FIGURE 4.

In preferred construction the frame 16 may have inwardly projecting lobes 58 and 60 projecting from the upper edge of the frame 16 and designed to overlie the upper rim of the spectacle to which the auxiliary sun glasses are secured.

The shaft 36 is of substantially uniform diameter and extends through the apertures in the sides 28 and 30 of the bridge 18. The shaft 36 is preferably made of deformable metal. The diameter of the apertures in the sides 28 and 30 of the bridge 18 determines the amount of vertical movement of the shaft 36. The shaft 36 is loosely fitted within the apertures of the bridge sides 28 and 30. The shaft 36 cannot be displaced laterally from the bridge 18 because of the alignment of the shaft 36 with the inner edges 31 and 32 of the lenses 12 and 14. Upon movement of the shaft 36 laterally an extremity of the shaft comes into contact with the inner edge of one of the aligned lens preventing further lateral movement. As is obvious, the shaft 36 cannot be displaced from the bridge 18 without considerable effort and distortion.

As the frame 16 is designed to be deformable to conform to the ordinary spectacles to which the auxiliary glasses 10 are fastened, the frame 16 is deformable at the offset bridge 18. The frame 16 may be bent at the bridge to provide the alignment of the auxiliary glass frame to the ordinary spectacle frame. In general, for the usual type of deformation required the size of the apertures in the sides 28 and 30 of the bridge 18 is sufficient to accommodate the displacement of the shaft vertically. Even in those relatively few instances where an unusual amount of deformation is required, the shaft 36 does not lose its function since the shaft 36 may also be deformed by bending if necessary.

Various modifications of the foregoing assemblage will be obvious to the skilled craftsman without departing from the basic structure conceived by the applicant. For example, in the event that lenses are used having exaggerated shapes, the frame may be changed to conform to the lens edges for riveting purposes without departing from the purpose of the medial bridge construction.

From the foregoing specification it is apparent that the disclosed invention will accomplish its function, may be altered by skilled workmen to fit particular needs, is simple and economical to manufacture and assemble, and fills a decided gap in auxiliary sun glasses construction.

In accordance with the patent statutes, the principles of construction and operation of this improvement in sun glasses construction have been described, and while an endeavor has been made to set forth the best embodiment thereof, it should be understood that changes may be made within the scope of the following claims without departing from the spirit of the invention.

I claim:

1. A pair of auxiliary glasses designed to be removably attached to a pair of ordinary spectacles, said glasses comprising:
   (a) a pair of lenses,
   (b) a frame member disposed along corresponding edges of said lenses,
   (c) means securing said frame member to said lenses to hold the lenses in spaced relation,
   (d) said frame member having an offset medial bridge intermediate said lenses,
   (e) said bridge having an aperture therethrough aligned with the inner opposed edges of said lenses and intermediate the same,
   (f) a shaft extending through said aperture,
   (g) a clip assembly mounted on said shaft to hold said auxiliary glasses removably attached to said spectacles,
   (h) whereby axial movement of said shaft is limited by said lens edges.

2. The structure of claim 1 and in which said frame member is generally horizontal and secured along upper edges of said lenses.

3. A pair of auxiliary glasses designed to be removably attached to a pair of ordinary glasses comprising:
   (a) a pair of lenses,
   (b) a frame member secured to said lenses to hold the same in spaced side by side relation,
   (c) said frame having a medial bridge intermediate said lenses,
   (d) said bridge having an aperture therethrough aligned with the inner opposed edges of said lenses and intermediate said inner opposed edges,
   (e) a shaft extending through said aperture and restrained from substantial axial movement by engagement of the ends of said shaft with said edges of said lenses,
   (f) a clip supported on said shaft and adapted to hold said auxiliary glasses attached to the ordinary glasses.

4. The structure of claim 3 and in which said clip is pivotally supported on said shaft and including resilient means urging said clip in one pivotal direction.

5. A pair of auxiliary glasses designed to be removably attached to a pair of ordinary glasses comprising:
   (a) a pair of lenses,
   (b) a frame member including end portions extending over corresponding surfaces of said lenses and secured thereto, said frame holding said lenses in spaced side by side relation,
   (c) said frame having an offset medial bridge portion intermediate the inner opposed edges of said lenses including angularly extending opposed side portions connected to said end portions and extending between said edges of said lenses and a central connecting portion connecting said side portions,
   (d) said side portions of said bridge including aligned apertures therethrough aligned with, and intermediate, said lens edges,
   (e) a shaft extending through said apertures and being restrained from substantial axial movement by engagement of the ends of the shaft with said edges of said lenses,
   (f) a spring clip pivotally supported on said shaft between said side portions of said bridge and being adapted to engage the ordinary glasses to hold said auxiliary glasses attached thereto.

6. The structure of claim 5 and in which the said spring clip includes
   (a) a clip body,
   (b) a pair of spaced parallel ears on said clip body having aligned apertures through which the intermediate portion of said shaft extends,
   (c) a pair of fingers on said body each extending toward a corresponding one of said lenses,
   (d) spring means encircling said shaft between said ears and urging said fingers toward said lenses.

References Cited in the file of this patent

UNITED STATES PATENTS

| | | |
|---|---|---|
| 2,408,273 | Sager | Sept. 24, 1946 |
| 2,584,000 | Ehlert et al. | Jan. 29, 1952 |
| 2,687,524 | Mosher | Aug. 31, 1954 |

FOREIGN PATENTS

| | | |
|---|---|---|
| 1,097,716 | Germany | Jan. 19, 1961 |
| 706,544 | Great Britain | Mar. 31, 1954 |